(12) United States Patent
Akiyama et al.

(10) Patent No.: US 6,456,446 B1
(45) Date of Patent: Sep. 24, 2002

(54) LENS HOLDER PROVIDED WITH A LENS HOLDING FRAME WHICH HOLDS A LENS HAVING A CIRCULAR OUTER DIAMETER

(75) Inventors: Ai Akiyama, Fujimi; Tamotsu Koiwai, Akiruno, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/688,918

(22) Filed: Oct. 16, 2000

(30) Foreign Application Priority Data

Oct. 25, 1999 (JP) .......................................... 11-302432

(51) Int. Cl.[7] .............................................. G02B 7/02
(52) U.S. Cl. ...................................................... 359/819
(58) Field of Search ................................ 359/819, 822, 359/813, 814; 396/526; 362/455

(56) References Cited

U.S. PATENT DOCUMENTS 2,937,571 A * 5/1960 Thompson ................... 359/813
3,463,019 A * 8/1969 Noe ............................ 74/89.23
5,249,082 A * 9/1993 Newman ..................... 359/813

FOREIGN PATENT DOCUMENTS

JP         05-113529         5/1993

* cited by examiner

Primary Examiner—Ricky Mack
(74) Attorney, Agent, or Firm—Frishauf, Holtz, Goodman & Chick, P.C.

(57) ABSTRACT

A lens holding frame holding a lens having a circular outer diameter includes a first holding member forming an inscribed circle corresponding to the outer circumference of the lens and a second holding member forming a larger inscribed circle than the inscribed circle formed by the first holding member. The first holding member comprises three projections and they are located at an equal distance in the circumferential direction of the lens holding frame. Similarly, the second holding member also comprises three projections and they are located at an equal distance in the circumferential direction of the lens holding frame. In this case, the projections forming the first holding member and the projections forming the second holding member are located alternately on the inner diameter of the lens holding frame in the circumferential direction respectively. Further, the projections composing the second holding member are composed so that they will form a larger inscribed circle than the inscribed circle formed by the projections composing the first holding member.

7 Claims, 2 Drawing Sheets

LENS HOLDER PROVIDED WITH A LENS HOLDING FRAME WHICH HOLDS A LENS HAVING A CIRCULAR OUTER DIAMETER

CROSS-REFERENCE TO RELATED APPLICATIONS

This application is based upon and claims the benefit of priority from the prior Japanese Patent Application No. 11-302432, filed Oct. 25, 1999, the entire contents of which are incorporated herein by reference.

BACKGROUND OF THE INVENTION

The present invention relates to a lens holder (lens mount) provided with a lens holding frame which holds a lens of a camera, binoculars or the like having a circular outer diameter so that the optical axis of the lens will lie in a predetermined position.

When mounting a lens to a lens holding frame, it is required to mount the lens so that the optical axis of the lens will lie in a predetermined position. Therefore, not only the accuracy of the parts has been improved, but also various contrivances have been made.

For example, in order to control the slippage of the optical axis due to production error of a part, it has been proposed to force the lens at the outer diameter thereof. However, in this method, stress applied to the lens due to force fit may deform the lens, thereby causing the deterioration of the optical performances.

Moreover, as a widely and generally used method, there is also a method of controlling the slippage of the optical axis by forming three projections on the lens holding frame, holding the lens by an inscribed circle thereof, and reducing manufacturing error of a part as much as possible. Further, by increasing the number of the projections to six, it is also possible to control the variation of the position of the lens. However, when trying to position a circular object at not less than three points, it cannot be expected which projections will position the circular body depending upon the result of the projections, and therefore, it is difficult to improve the accuracy of the parts dimensions.

As described above, various contrivances have been made so that the optical axis of the lens will lie in a predetermined position when mounting the lens to the lens holding frame, however, it has not been attained yet to control the variation of the lens position due to production error of a part by a simple structure.

BRIEF SUMMARY OF THE INVENTION

The present invention has been made in consideration of the above-described problems and has an object of providing a lens holder being capable of controlling the variation of the lens position due to manufacturing error of a part by a simple structure.

According to a first aspect of the present invention, there is provided a lens holder provided with a lens holding frame which holds a lens having a circular outer diameter, comprising:

a first holding member disposed on the inner diameter of the lens holding frame and having a plurality of main-receiving surfaces so that an inscribed circle corresponding to the outer shape of the lens will be formed; and a second holding member disposed on the inner diameter of the lens holding frame and having a plurality of sub-receiving surfaces so that an inscribed circle having a larger diameter than that of the inscribed circle formed by the first holding member will be formed.

According to a second aspect of the present invention, there is provided a lens holder provided with a lens holding frame which holds a lens having a circular outer diameter, comprising:

a plurality of first projections formed at a first radius distance from the central axis of the lens holding frame in the circumferential direction in order to bring the lens into collision with them and to position the lens; and a plurality of second projections formed at a second radius distance larger than the first radius distance from the central axis of the lens holding frame in the circumferential direction in order to bring the lens into collision with them and to position the lens, wherein the first radius distance of the first projections is slightly larger than the dimension of the outer diameter of the lens, and therefore, the lens can be fitted and held, and when the lens moves in the vertical direction to the optical axis due to fitting play between it and the first projections, the amount of movement of the lens is controlled within a predetermined amount by the second projections.

According to a third aspect of the present invention, there is provided a lens holder provided with a cylindrical member for holding a lens having a circular outer diameter, comprising:

at least not less than three first projections protruding towards the central axis of the cylindrical member and formed on the inner surface of the cylindrical member for holding the lens by the tips thereof colliding with the outer circumference edge of the lens, the diameter of the circle to which the tips of the first projections are inscribed being slightly larger than the outer diameter of the lens; and at least not less than three second projections protruding towards the central axis of the cylindrical member and formed on the inner surface of the cylindrical member for holding the lens by the tips thereof colliding with the outer circumference edge of the lens, the diameter of the circle to which the tips of the second projections are inscribed being larger than the diameter of the circle to which the tips of the first projections are inscribed, wherein when the lens moves in the vertical direction to the optical axis due to fitting play between it and the first projections, the amount of movement of the lens is controlled by the outer circumference edge of the lens colliding with the second projections.

According to a fourth aspect of the present invention, there is provided a lens holder provided with a lens holding frame which holds a lens having a circular outer diameter, comprising:

a plurality of first hold members formed at a position with which the outer circumference of the lens can collide along the circumferential direction of the lens holding frame in order to control the optical axis of the lens in the vicinity of an ideal position to the lens holding frame, wherein by at least a part of the plurality of first hold members colliding with the outer circumference of the lens, the position of the lens can be controlled so that the amount of the slippage of the position of the lens to the ideal position will lie between a first value and a second value; and a plurality of second hold members formed at a position with which the outer circumference of the lens can collide along the circumferential direction of the lens holding frame, wherein by at least a part of the plurality of second hold members colliding with the outer circumference of the lens, the position of the lens is controlled so that the amount of the slippage of the position of the lens to the ideal position will be smaller than the second value.

According to a fifth aspect of the present invention, there is provided a lens holder provided with a cylindrical member for folding a lens having a circular outer diameter, comprising:

at least not less than three first projections protruding towards the central axis of the cylindrical member and formed on the inner surface of the cylindrical member for holding the lens by the tips thereof colliding with the outer circumference edge of the lens, the diameter of the circle to which the tips of the first projections are inscribed being slightly larger than the outer diameter of the lens; and at least not less than three second projections protruding towards the central axis of the cylindrical member and formed on the inner surface of the cylindrical member for holding the lens by the tips thereof colliding with the outer circumference edge of the lens, the diameter of the circle to which the tips of the second projections are inscribed being larger than the diameter of the circle to which the tips of the first projections are inscribed, wherein when the lens moves in the vertical direction to the optical axis due to fitting play between it and the first projections, the amount of movement of the lens is controlled by the outer circumference edge of the lens colliding with the second projections.

According to a sixth aspect of the present invention, there is provided a lens holder for holding a lens having one optical axis comprising:

a lens holding frame having a virtual axis with which the optical axis of the lens is to be coincided; and a holding member including:
  a first holding member for controlling so that the distance between the optical axis and the virtual axis will be smaller than a first distance when the lens is fitted in the lens holding frame; and
  a second holding member for controlling so that the distance between the optical axis and the virtual axis will be smaller than a second distance when the lens is fitted in the lens holding frame.

According to a seventh aspect of the present invention, there is provided a lens holder provided with a lens holding frame having an opening for holding a lens, comprising:

three first protruding parts protruding into the opening for holding the outer circumference of the lens; and second protruding part protruding into the opening so as to be able to collide with the outer circumference of the lens and formed so as not to enter an inscribed circle formed by the three first protruding parts.

According to an eighth aspect of the present invention, there is provided a lens holder provided with a lens holding member for holding a lens, comprising:

a first position control member provided in the lens holding member and being capable of controlling the movement of the lens; and a second position control member provided in the lens holding member and being capable of controlling the movement of the lens, wherein the first position control member and the second position control member are set so that the gap between the lens and the second position control member will be larger than the gap between the lens and the first position control member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PRESENT INVENTION

Figure 1:
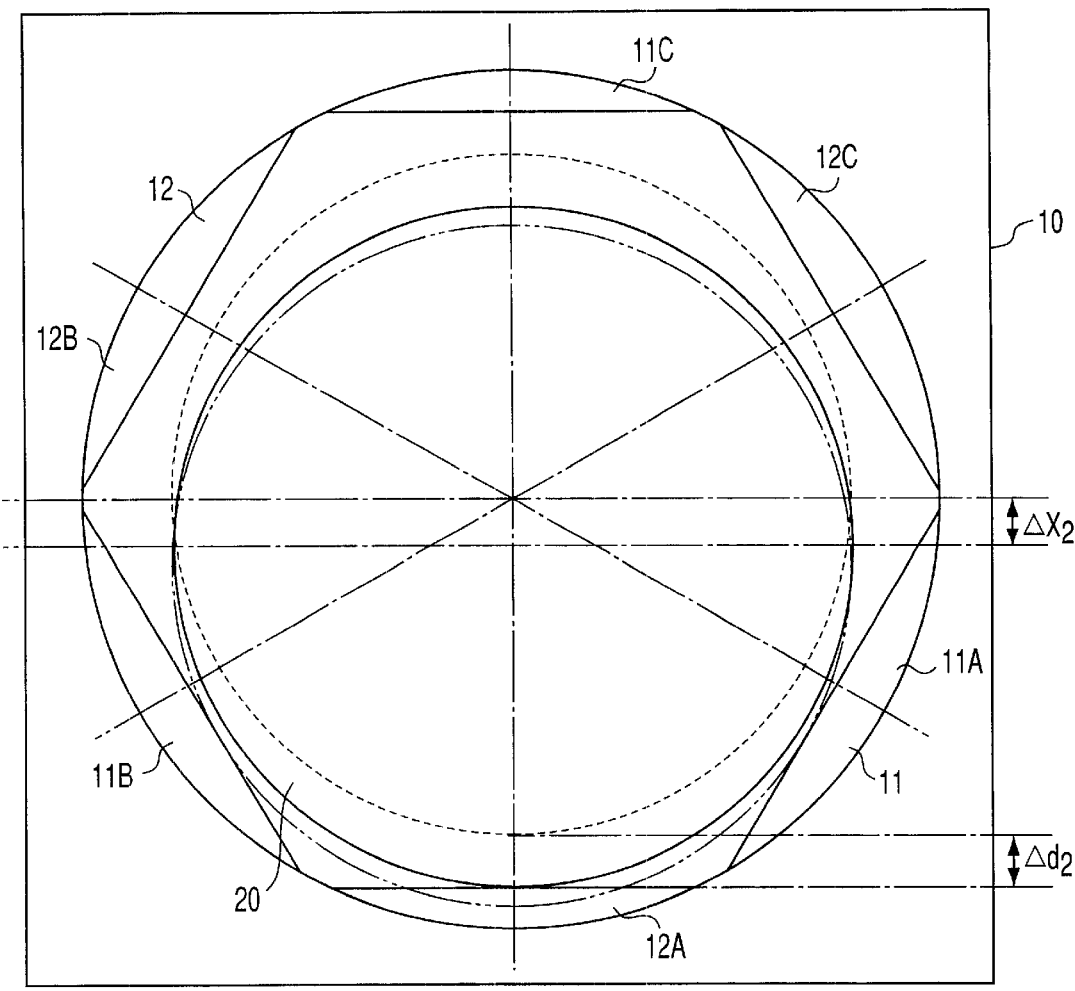
FIG. 1 is a front view showing the structure of a lens holder according to one embodiment of the present invention.

Now, referring to the drawings, an embodiment of the present invention will be described.

Figure 2:
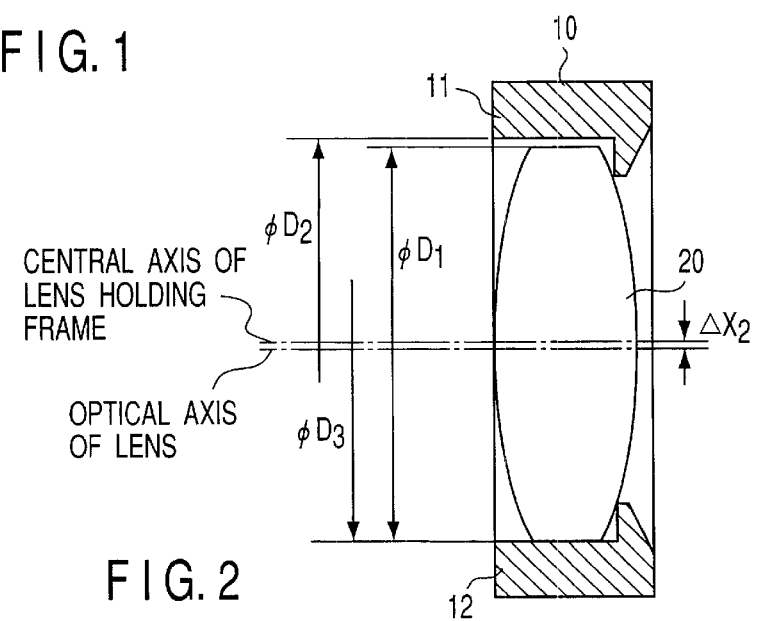
FIG. 2 is a sectional view showing the structure of the lens holder according to the embodiment of the present invention.

FIGS. 1 and 2 are a front view and a sectional view of a lens holder according to one embodiment of the present invention respectively. This lens holder is provided with a lens holding frame (cylindrical member) 10 which is a cylindrical member holding a lens 20 having a circular outer diameter. And the lens holding frame 10 includes a first holding member (first position control member) 11 forming an inscribed circle corresponding to the outer diameter of the lens 20 and a second holding member (second position control member) 12 forming a larger inscribed circle than the inscribed circle formed by the first holding member 11.

That is, the first holding member 11 includes three projections (projecting parts; first projections; first hold members; first protruding parts) 11A, 11B and 11C, and they are located at an equal distance in the circumferential direction of the lens holding frame 10. Similarly, the second holding member 12 also includes three projections (projecting parts; second projections; second hold members; second protruding parts) 12A, 12B and 12C, and they are located at an equal distance on the inner diameter of the lens holding frame 10 in the circumferential direction. In this case, the projections composing the first holding member 11 and the projections composing the second holding member 12 are located alternately on the inner diameter of the lens holding frame 10 in the circumferential direction respectively.

Here, the first holding member 11 is a conventionally known lens positioning member holding the lens 20 by the inscribed circle thereof. That is, if the three projections 11A, 11B and 11C of this first holding member can be produced with desired dimensions, the slippage of the optical axis of the lens does not exist. However, actually, since it is impossible to produce them with such precise dimensions, there remain parts production errors and the slippage of the position of the lens, that is, the slippage of the optical axis exists.

Now, referring to FIG. 3, this phenomenon will be described. Moreover, this figure is exaggerated for illustrating the amount of the slippage of the position larger, and the actual relative relations of the dimensions of the various members are different from this figure (the same as to FIGS. 1 and 2).

Now, assuming that the outer diameter of the lens 20 is $D_1$, the diameter of the inscribed circle of the first holding member 11 is $D_2$, the distance of the first holding member $2\times\theta_1$ and the play between the outer diameter of the lens 20 and the diameter of the inscribed circle of the first holding member 11 is $\Delta d_1$, the slippage of the position $\Delta X_1$ from the ideal position of the lens 20 at the time of mounting (the ideal position of the lens shown with a broken line in the figure) is as follows:

$$\Delta d_1 = (D_2 - D_1)/2$$

$$\Delta X_1 = \Delta d_1 / \cos\theta_1$$

Here, for example, assuming that the outer diameter $D_1$ of the lens 20 has a nominal dimension of $\Phi=30$ mm and a tolerance of $-0.03$ mm to 0 mm, that the diameter $D_2$ of the inscribed circle of the first holding member has a nominal dimension of $\Phi=30$ mm and a tolerance of $+0.01$ mm to $+0.04$ mm, and that the $\theta_1$ is 60 degrees, the slippage of the position of the lens 20 at the time of mounting $\Delta X_1$ is max. 0.07 mm from the formula.

On the other hand, in this embodiment, in addition to the three projections 11A, 11B and 11C of the first holding member 11, as described above, a second holding member 12 including three projections 12A, 12B and 12C is further provided in order to control the slippage of the position of the lens 20 due to parts production errors of the lens 20, that is, the slippage of the optical axis due to production quality scatter. As described above, the three projections included in the first holding member 11 and the second holding member 12 respectively are located alternately at an equal distance along the inner circumference of the lens holding frame 10, however, the projections of the second holding member 12 are located preferably between the adjacent projections of the first holding member 11 respectively. That is, the projections of the second holding member 12 are located most preferably on a bisector formed by the adjacent projections of the first holding member 11 and by the center of the inscribed circle formed by the first holding member respectively.

Figure 3:
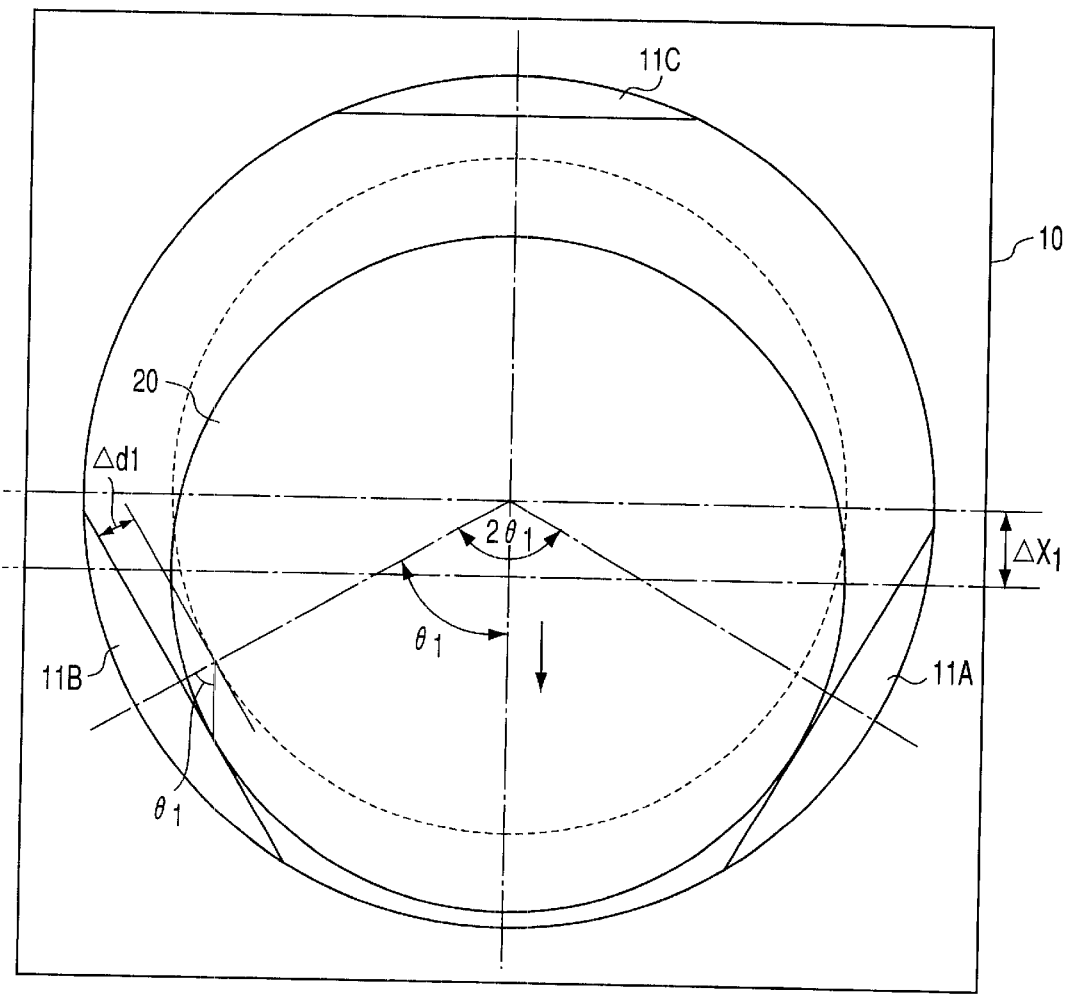
FIG. 3 is a front view showing the structure of a conventional lens holder provided with only a first holding member on a lens holding frame.

As shown in FIG. 1, since the lens 20 is controlled by this second holding member 12, the slippage of the position of the lens 20 becomes smaller compared with a case shown in FIG. 3 (the position of the lens shown with a double-dotted chain line).

That is, assuming that the diameter of the inscribed circle of the second holding member 12 is $D_3$, and that the play between the lens 20 and the inscribed circle formed by the second holding member 12 is $\Delta d_2$, the slippage of the lens 20 at this time $\Delta X_2$ is as follows:

$$\Delta X_2 = \Delta d_2 = (D_3 - D_1)/2$$

Here, for example, assuming that the diameter $D_3$ of the inscribed circle of the second holding member has a nominal dimension of $\Phi=30$ mm and a tolerance of $+0.04$ mm to $+0.07$ mm, the slippage of the position of the lens 20 at the time of mounting $\Delta X_2$ is max. 0.05 mm.

Like this, by providing the second holding member 12, the slippage of the position of the lens 20 can be controlled.

Moreover, as described above, even if the number of projections of the first holding member 11 to six, it cannot be expected which projections will position the lens 20 depending upon the result of the projections, and therefore, it is difficult to improve the accuracy of the parts dimensions. On the other hand, in this embodiment, by forming the second holding member 12 so that the inscribed circle formed by the second holding member 12 will be larger than the inscribed circle formed by the first holding member 11, it becomes possible to improve the accuracy of the parts dimension of the projections 11A, 11B and 11C and the accuracy of the parts dimension of the projections 12A, 12B and 12C separately, and the slippage of the position of the lens 20 can be controlled.

Now, the concrete determination (making) processes of the dimensions of the first and second holding members 11 and 12 will be described.

That is, in a mold injection forming, it is known that the shape of a part cannot transfer a mold 100 percent. Therefore, in the present invention, 1̂ The deformation due to forming of a lens holder is expected, and the inscribed circle formed by the six projections of the first and second holding members 11 and 12 is formed by the expected amount of the deformation larger, or the projections of the second holding member 12 are formed so that they will have a smaller amount of protrusion than the projections of the first holding member 11.

2̂ The diameter of the inscribed circle formed by the three projections of the first holding member 11 of the actually formed lens holder 10 and the central position thereof are measured.

3̂ The amount of the protrusion of the projections 11A, 11B and 11C of the first holding member 11 is corrected respectively (the mold is processed additionally) so that the inscribed circle corresponding to the outer diameter of the lens will be obtained and the center of the inscribed circle will lie on a desired position.

4̂ Next, the amount of the protrusion of the projections 12A, 12B and 12C of the second holding member 12 is corrected respectively (the mold is processed additionally) so that the diameter of the inscribed circle formed by the projections 12A, 12B and 12C will be larger than the result (measurement) of the corrected inscribed circle formed by the projections 11A, 11B and 11C of the first holding member 11 and so that both centers of the inscribed circles will coincide with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens holder provided with a cylindrical member for holding a lens having a circular outer diameter, said lens holder comprising:

at least three first projections protruding towards a central axis of said cylindrical member and formed on an inner surface of said cylindrical member for holding said lens, said first projections having tips which collide with an outer circumference edge of said lens, and a diameter of a circle to which the tips of said first projections are inscribed being slightly larger than an outer diameter of said lens; and at least three second projections protruding towards the central axis of said cylindrical member and formed on the inner surface of said cylindrical member for holding said lens, said second projections having tips which collide with the outer circumference edge of said lens, and a diameter of a circle to which the tips of said second projections are inscribed being larger than the diameter of the circle to which the tips of said first projections are inscribed, wherein when said lens moves in a direction vertical to an optical axis of said lens due to fitting play between said lens and said first projections, an amount of movement of said lens is controlled by the outer circumference edge of said lens colliding with said second projections.

2. The lens holder according to claim 1, wherein said lens is positioned by colliding with the tips of said first projections and said second projections.

3. A lens bolder provided with a lens holding frame which holds a lens having a circular outer diameter, said lens holder comprising:

a plurality of first hold members formed at positions at which an outer circumference of said lens can collide along a circumferential direction of said lens holding frame in order to control an optical axis of the lens in a vicinity of an ideal position to said lens holding frame, wherein by at least a part of said plurality of first hold members colliding with the outer circumference of said lens, a position of said lens can be controlled so that an amount of slippage of the position of said lens from said ideal position will lie between a first value and a second value; and a plurality of second hold members formed at positions at which the outer circumference of said lens can collide along the circumferential direction of said lens holding frame, wherein by at least a part of said plurality of second hold members colliding with the outer circumference of said lens, the position of said lens is controlled so that the amount of the slippage of the position of said lens from said ideal position will be smaller than said second value.

4. The lens holder according to claim 3, wherein said first hold members and said second hold members are located alternately on an inner circumference of said lens holding frame in the circumferential direction.

5. A lens holder provided with a lens holding frame which holds a lens having a circular outer diameter, said lens holder comprising:

a plurality of first projections formed at a first radius distance from a central axis of said lens holding frame in a circumferential direction in order to bring said lens into collision with said first projections and position said lens; and a plurality of second projections formed at a second radius distance larger than said first radius distance from the central axis of said lens holding frame in the circumferential direction in order to bring said lens into collision with said second projections and position said lens, wherein said first radius distance of said first projections is slightly larger than the outer diameter of said lens, so that said lens can be fitted and held, and wherein when said lens moves in a direction vertical to an optical axis of said lens due to fitting play between said lens and said first projections, an amount of movement of said lens is controlled to be within a predetermined amount by said second projections.

6. The lens holder according to claim 5, wherein the first projections and the second projections are located alternately on an inner circumference of said lens holding frame in the circumferential direction.

7. The lens holder according to claim 6, wherein said first projections and said second projections each comprise three projecting parts provided on an inner circumference of said lens holding frame, and the projecting parts are located at intervals of an equal distance along the circumferential direction.

* * * * *